J. BRODIE.
Ore Stamp.
No. 2,090. Reissued Oct. 17, 1865.
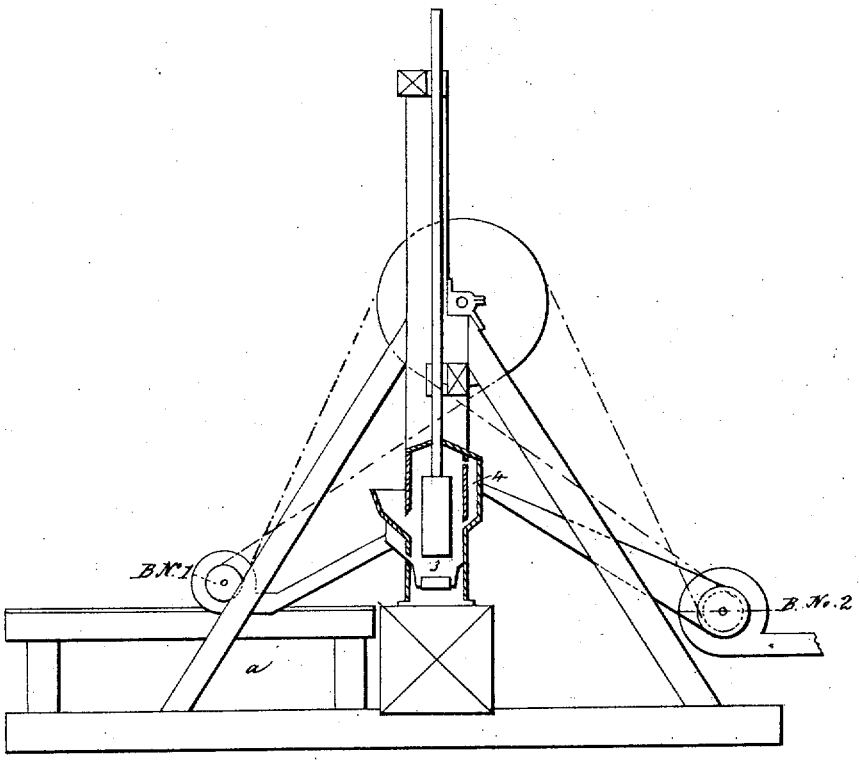
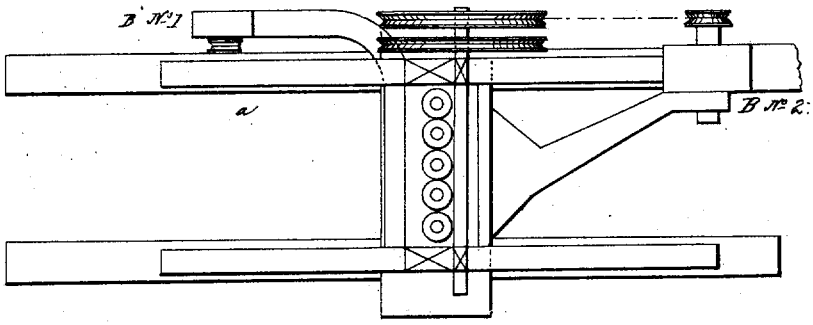
Witnesses:
J. D. Morgan
George Morgan
Inventor:
James Brodie
AM. PHOTO-LITHO. CO. N.Y. (OSBORNE'S PROCESS.)

UNITED STATES PATENT OFFICE.

JAMES BRODIE, OF SAN FRANCISCO, CALIFORNIA.

IMPROVED APPARATUS FOR COLLECTING THE DUST FROM STAMP-MILLS AND ORE-CRUSHERS.

Specification forming part of Letters Patent No. 42,743, dated May 17, 1864; Reissue No. 2,090, dated October 17, 1865.

*To all whom it may concern:*

Be it known that I, JAMES BRODIE, of the city and county of San Francisco, State of California, have invented a new and useful improvement on a machine for the purpose of separating and saving the fine pulverized dust from the coarser particles of crushed gold and silver rock or ores, to be applied in or out of a crushing-machine, and known as "Brodie's Wind-Blast Separator;" and I hereby declare that the following is a full, clear, and exact description of the construction and operation of the same, reference being had to the annexed drawings, making a part of this specification, in which—

Letters A A exhibit plan and elevation of the ordinary stamp-battery with improvement attached. Letter B, No. 1, exhibits improvement, which is a blow-pipe or tube from a fan-blower creating a wind-blast introduced into battery at Fig. 3, through the blow pipe or tube, which throws the wind under the stamp, thereby separating the fine pulverized dust from the larger particles of the materials crushed by stamps. Letter B, No. 2, exhibits improvement, and is the suction pipe of a fan-blower introduced into the battery at Fig. 4, which is used for carrying off the fine dust forced from the materials being crushed by the force of the wind-blast created by B, No. 1, and conveying the said fine dust to a place of deposit outside of the battery.

What I claim as my improvement, and for which I ask Letters Patent, is—

The application of the wind-blast through pipes or tubes into or by suction out of batteries or other crushing-machines, as exhibited and applied in the drawings, for the purpose of saving the fine dust arising from said crushings.

JAMES BRODIE.

Witnesses:

C. M. RADCLIFF,

W. W. LAWTON.